United States Patent [19]
Sumner, Jr. et al.

[11] Patent Number: 4,505,885
[45] Date of Patent: Mar. 19, 1985

[54] METHOD OF REMOVING WATER FROM ALKALI METAL HYDROXIDE SOLUTIONS

[75] Inventors: William C. Sumner, Jr.; Gale G. Hoyer, both of Midland, Mich.; William G. Kozak, Decatur, Ill.

[73] Assignee: The Dow Chemical Company, Midland, Mich.

[21] Appl. No.: 505,639

[22] Filed: Jun. 20, 1983

[51] Int. Cl.³ .............................................. C01D 1/00
[52] U.S. Cl. ..................................... 423/592; 423/641
[58] Field of Search ....................... 423/583, 641, 592; 210/21

[56] References Cited

U.S. PATENT DOCUMENTS

| | | | |
|---|---|---|---|
| 1,961,590 | 6/1934 | MacMullin | 423/643 |
| 2,196,593 | 4/1940 | Muskat | 423/643 |
| 2,196,594 | 4/1940 | Muskat | 423/643 |
| 2,285,300 | 6/1942 | Muskat | 23/302 R |
| 2,373,257 | 4/1945 | Muskat | 23/302 R |
| 3,308,063 | 3/1967 | Hess et al. | 210/59 |
| 3,316,172 | 4/1967 | Hess | 210/59 |
| 3,318,805 | 5/1967 | Hess et al. | 210/21 |
| 3,325,400 | 6/1967 | Hess et al. | 210/21 |
| 3,350,299 | 10/1967 | Hess et al. | 210/22 |
| 3,350,300 | 10/1967 | Hess et al. | 210/22 |
| 3,373,105 | 3/1968 | Quptill, Jr. et al. | 210/642 |
| 3,395,098 | 7/1968 | Hess et al. | 423/157 |
| 3,706,659 | 12/1972 | Davis | 210/21 |
| 3,983,032 | 9/1976 | Hess et al. | 210/21 |

OTHER PUBLICATIONS

G. P. Golysheva et al., Russian Journal of Physical Chemistry, 50(4), p. 635, 1976.

Primary Examiner—Veronica O'Keefe
Attorney, Agent, or Firm—Joe R. Prieto

[57] ABSTRACT

A method removing water from aqueous alkali metal hydroxide solutions by contacting the solution with an organic liquid at elevated temperatures and pressures to form an organic liquid-water phase and a hydroxide solution phase and thereafter separating the organic water phase from the hydroxide solution phase.

26 Claims, 1 Drawing Figure

METHOD OF REMOVING WATER FROM ALKALI METAL HYDROXIDE SOLUTIONS

BACKGROUND OF THE INVENTION

This invention relates to a novel method for the removal of water from aqueous alkali metal hydroxide solutions, and particularly to a method of removing water from aqueous sodium hydroxide solutions.

Alkali metal hydroxide solutions are commonly produced by electrolyzing an alkali metal halide solution in an electrolytic cell. Sodium hydroxide, for example, is commonly produced by electrolyzing sodium chloride brine solution in an electrolytic cell for producing chlorine. The cell usually generates about two molecules of hydroxide for each one molecule of chlorine. The sodium hydroxide, as an effluent stream of such cells, may be produced in various strengths, normally in concentrations of 8 to 40 percent by weight. In a diaphragm type chlorine cell, for example, sodium hydroxide may be present at 8 to 12 percent by weight, while production in a membrane type chlorine cell may result in sodium hydroxide concentrations of up to 40 percent by weight. However, for commercial use sodium hydroxide is generally concentrated to strengths of 50 percent by weight.

Concentration of the hydroxide solutions is normally accomplished by evaporating the water from the hydroxide stream using single or multiple effect evaporators. Energy requirements for this concentration step can total several thousand British Thermal Units (Btu's) per pound of hydroxide processed.

It is also known to concentrate sodium hydroxide or caustic solutions by treating the caustic solution with liquid ammonia as disclosed in U.S. Pat. Nos. 1,961,590 and 2,196,593. The liquid ammonia, in these processes, absorbs and removes the water in the caustic solution at a certain temperature and pressure forming a water-containing ammonia liquid phase which is subsequently removed from the caustic.

Although the aforementioned methods are operable, it is desired to provide a relatively simple method of removing water from an aqueous alkali metal hydroxide solution which is believed to be capable of being operated efficiently and economically

SUMMARY OF THE INVENTION

In accordance with the present invention, water is removed from an aqueous alkali metal hydroxide solution to effectuate concentration of the solution. The alkali metal hydroxide solution is contacted with an organic liquid at an elevated temperature and pressure which results in removal of at least a portion of water from the hydroxide solution. The organic liquid with the removed portions of water therein is thereafter separated from the hydroxide solution.

DESCRIPTION OF THE PREFERRED EMBODIMENTS

Figure 1:
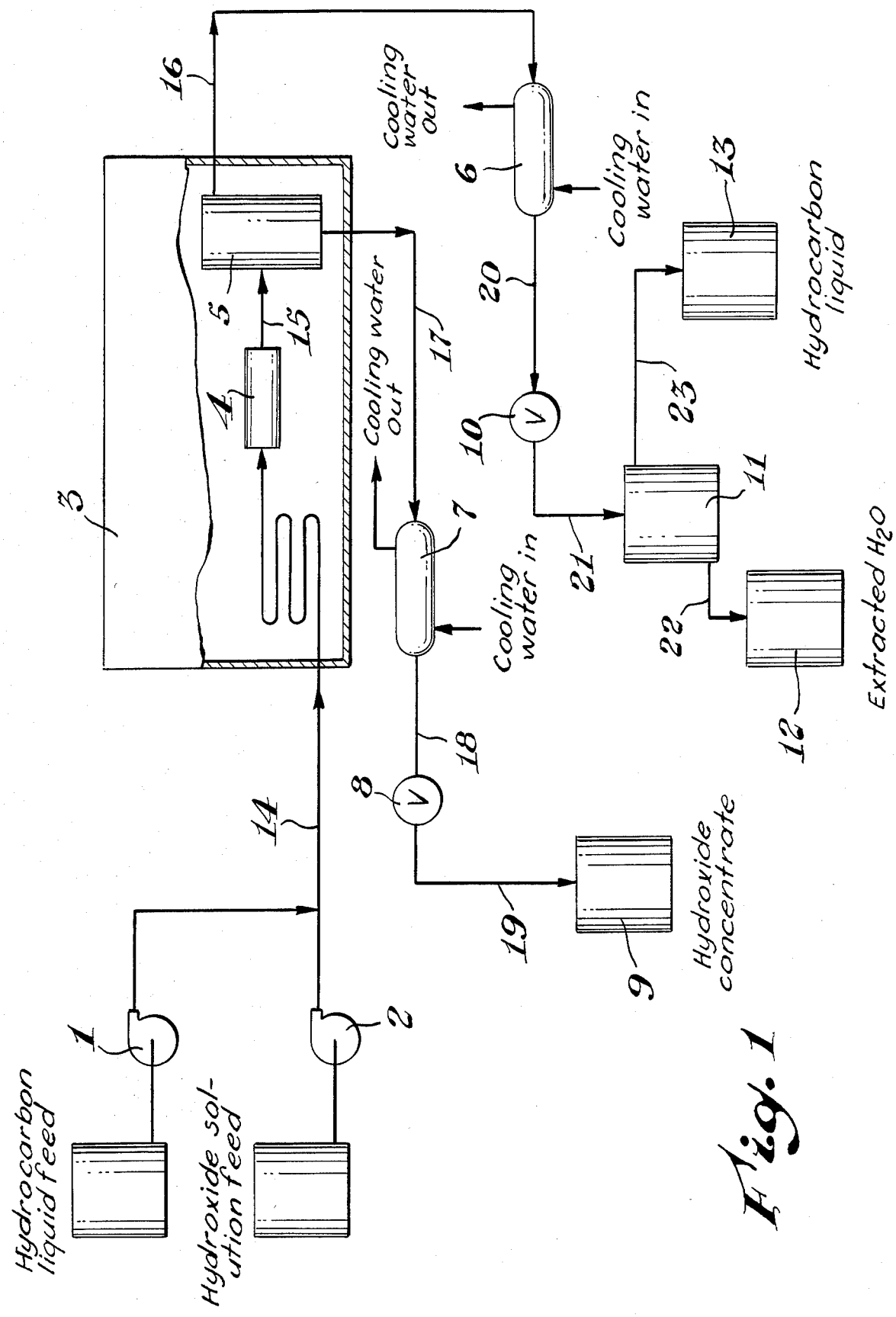
FIG. 1 is a schematic illustration of one embodiment of the present invention.

The present invention, which is carried out either in a single batch method or on a continuous basis, involves removing water from an aqueous alkali metal hydroxide solution, thereby concentrating the solution. The solution is contacted with an organic liquid, at an elevated temperature and pressure, which, it is believed, serves to separate the water from the solution by solubilizing at least a portion of the water molecules in the solution into the organic liquid thereby forming an organic liquid-water phase and a relatively concentrated alkali metal hydroxide solution phase. At least a portion, and preferably substantially all, of the organic liquid-water phase is then separated from the hydroxide solution phase thereby leaving the hydroxide solution in a more concentrated state. The organic liquid-water phase may thereafter be further processed to separate at least a portion of the water from the organic liquid. If desired, the organic liquid may be recycled to the contacting step above.

An alkali metal hydroxide refers to one or more of the alkali metals such as lithium, sodium, potassium, rubidium and cesium, combined with a hydroxyl group as an ion pair.

The solutions of the above hydroxide may contain additives or impurities inert to the hydroxide used and the organic liquid used to remove a portion of the water from the hydroxide solution. For example, varying amounts of halides, halates, carbonates and sulfates of sodium and potassium may be present in hydroxide solutions. The solutions of the above hydroxide is intended to include the effluent or caustic stream of a chlor-alkali electrolytic process.

The organic liquids used in the present invention can be hydrocarbons. The hydrocarbons used in the invention are characterized as being able to extract or dissolve a greater amount of water with increasing temperature. The hydrocarbons may be either saturated or unsaturated aliphatic hydrocarbons, substituted or unsubstituted aromatic hydrocarbons or mixtures of these various hydrocarbons. The liquid hydrocarbons suitable for use in the method of this invention generally are those hydrocarbons containing from about 6 to about 20 carbon atoms per molecule, and preferably those hydrocarbon liquids containing 6 to 12 carbon atoms per molecule. The hydrocarbons must be stable in dilute and concentrated hydroxide solutions over the range of temperatures required for this invention. Examples of hydrocarbon liquids satisfactory for use in the present invention are aliphatic compounds such as hexane, heptane, nonane, and 4-methyl-2-pentene; alicyclic compounds such as cyclohexane and its alkyl substitution derivaties and aromatic compounds such as benzene, toluene, ethylbenzene, dimethyl benzene, isopropylbenzene, and tertiary butylbenzene. Any of these hydrocarbons or combination thereof can be used. Preferred hydrocarbons are those which have low toxicity and low solubility in water at ambient temperature (70° F.) and atmospheric pressure (14.7 psia).

The hydroxide solution is contacted with a suitable liquid hydrocarbon at sufficient temperature and pressure such that at least a portion of the water from the hydroxide solution is removed or extracted by the liquid hydrocarbon. The term "extract" is used herein to denote the hydrocarbon-water phase formed when the aqueous hydroxide solution is contacted with hydrocarbon. The exact nature of the extract is not known at this time. The extract formed is immiscible with the hydroxide solution phase which, removed from the extract, has a higher concentration of hydroxide than the original solution. The hydroxide solution phase is referred herein as "hydroxide concentrate".

In order to remove the greatest portion of water from the hydroxide solution, the hydroxide solution is contacted with a liquid hydrocarbon at a temperature of above about 500° F. and preferably above about 550° F. The contacting temperature, also referred to as the "extraction temperature" herein, may be lower than or equal to the "critical temperature" of the hydrocarbon to maintain the hydrocarbon in the liquid state. The "critical temperature" refers to the highest temperature at which it is possible to separate a substance into two fluid phases, vapor and liquid. Above the critical temperature only a single fluid phase, i.e. a vapor or dense gas, exists.

The contacting pressure, also referred to as the "extraction pressure", is preferably sufficiently high to prevent vaporization of all or substantially all of the hydroxide concentrate and of the extract formed. Vaporization of either liquid would require additional heat to be supplied in the operation of this invention, which would add to the cost of operation. The extraction pressure is normally at least about 1000 psia. The maximum pressure used is not critical but is normally about 3500 psia to maintain the hydroxide concentrate and extract in the liquid state.

Once the extract formed above is separated from the hydroxide solution phase, the extract may be resolved into two distinct phases, one phase being a water phase and the other a hydrocarbon phase consisting of a more dilute solution of water in the hydrocarbon. Resolution of the extract into the two phases above may be carried out by changing either the extraction temperature or the extraction pressure or both depending on the solubility of water in a selected hydrocarbon at the various temperatures and pressures used.

One method of resolving the extract into a water phase and hydrocarbon phase is to lower the temperature and pressure below the extraction temperature and pressure sufficient to effectuate the phase separation. Another method is to maintain the extract at or near the extraction temperature and increase the pressure sufficient to effectuate the phase separation.

Still another method, which is the preferred method, is to maintain the extract at or near the extraction pressure and decrease the temperature of the extract below the extraction temperature sufficient to effectuate the phase separation. Preferably, resolution of the extract may be carried out at a temperature of at least about 20° F. below the extraction temperature and, more preferably, at least about 50° F. below the extraction temperature. Resolution of the extract is carried out at a pressure which is generally the same as the aforementioned extraction pressure, but may differ as long as vaporization of the water or hydrocarbon does not occur. For example, a tertiary butylbenzene-water extract containing 45 weight percent water, obtained at an extraction temperature and pressure of 626° F. and 2000 psig respectively, can be resolved or separated into a water phase and a tertiary butylbenzene phase containing 19.6 weight percent water by lowering the resolution temperature to 576° F. and maintaining the pressure at 2000 psig.

Referring to FIG. 1, a hydrocarbon liquid feed, for example, ethylbenzene, and an aqueous alkali metal hydroxide solution feed, for example, an aqueous solution of sodium hydroxide are pressurized at ambient temperature to about 2,000 psig by pump means, 1 and 2, respectively. An oven 3 enclosing a static mixer 4 and a separator vessel 5 is kept at about 630° F. with recirculating hot air. A combined stream of the hydrocarbon liquid and the hydroxide solution is fed into the static mixer 4 through a conduit 14. The mixture is then passed into the separator vessel 5 through a conduit 15. In the separator vessel 5, a heavier phase of hydroxide concentrate gravitationally separates from a lighter phase of hydrocarbon liquid with water extracted from the hydroxide solution. The lighter hydrocarbon liquid-water phase is drawn from the top of the separator vessel 5 through a conduit 16 and the heavier hydroxide concentrate is drawn from the bottom of the separator vessel 5 through a conduit 17 to coolers 6 and 7, respectively. The hydroxide concentrate is cooled to ambient temperature with cooler 7 and thereafter passes through a conduit 18 through a level control valve 8. The level control valve 8 is used to maintain the interface of the two phases within the central area of separator vessel 5. The hydroxide concentrate passes through a conduit 19 and is collected in a receiver 9, at ambient pressure.

The hydrocarbon liquid-water phase leaving the separator vessel 5 through conduit 16 is cooled to within a range of about 60° F. to about 80° F. with cooler 6 and passes through a conduit 20, through a pressure control valve 10 to reduce the pressure to ambient pressure and through a conduit 21 to a gravity decanter 11. In the gravity decanter 11, the hydrocarbon liquid-water phase gravitationally separates into two phases, a hydrocarbon liquid phase and a water phase. The heavier water phase is drawn from the bottom of the decanter 11 and flows through a conduit 22 to a receiver 12. The lighter hydrocarbon liquid is drawn from the top of decanter 11 and flows through a conduit 23 to receiver 13. The different phases may be measured to determine the concentration of each component in the different streams. The water content of the extract is determined by the ratio of the mass of the water leaving the decanter over the total mass of the decanter effluent, expressed as weight percent of water in the extract.

The process of the present invention is carried out using conventional equipment suitable for operating under the temperatures and pressures of the invention and under a continuous or batch type operation. The equipment is manufactured of material resistant to the corrosion of the hydroxide used, suitably nickel or nickel plated inconel. Corrosion of inconel equipment used in continuous extraction may be reduced by first flowing the hydrocarbon liquid through the equipment of the instant process to form a hydrocarbon protective film on the internals of the equipment and subsequently combining the flow of hydroxide solution with the flow of hydrocarbon liquid.

The following examples are illustrative of the present invention.

EXAMPLE 1

With reference to FIG. 1, a stream of 156 grams per hour of a 30.4 weight percent sodium hydroxide aqueous solution was combined with 176 grams per hour of tertiary butylbenzene at 2300 psig with positive displacement metering pumps. The the combined stream was pumped sequentially through a preheat coil, a static mixer, and a separator vessel all inside a heated oven. The combined stream was heated to 644° F. After mixing and entering the separator vessel the mixture was divided into two distinct phases, one being a sodium hydroxide solution phase and the other a tertiary butylbenzene-water phase. The sodium hydroxide solution phase was withdrawn from the bottom of the separator vessel, cooled to about 78° F. and depressurized to about atmospheric pressure at a rate of 133 grams per hour at a concentration of 35.7 percent by weight of sodium hydroxide. The tertiary butylbenzene-water extract was withdrawn from the top of the separator vessel, cooled to room temperature and depressurized to atmospheric pressure. The tertiary butyl benzene-water extract was then passed into the decanter and upon gravity separation produced 177 grams per hour of tertiary butylbenzene leaving the decanter for each 24 grams hour of extracted water.

EXAMPLES 2-7

Examples 2-7 were completed using an apparatus as described in FIG. 1 and the same procedure of Example 1. In Examples 2-7, sodium hydroxide solution and tertiary butylbenzene mixture was pressurized to 2000 psig and heated to 626° F. to extract $H_2O$ from an aqueous sodium hydroxide solution. Feed rates of the sodium hydroxide solution and the tertiary-butyl benzene were changed between runs. The identical composition of the sodium hydroxide feed solution was used for Examples 2 and 3. Examples 5 and 6 also used the identical composition of sodium hydroxide feed solution. The results described in Table I and II were obtained during each run after steady state conditions of mass flow rates and temperatures were reached. The amount of total organic carbon (TOC) in the NaOH concentrate is the amount of tertiary butylbenzene and any other hydrocarbon impurities existing in the NaOH concentrate as measured by a conventional carbon analyzer.

TABLE I

| Ex. No. | Feed NaOH Solution Wt % NaOH | Feed NaOH Solution Grams/hour | Feed t-butyl-benzene grams/hour | Wt. % NaOH in NaOH Concentrate | Wt % $H_2O$ in t-butyl-benzene-$H_2O$ Extract |
|---|---|---|---|---|---|
| 2 | 10.4 | 536 | 113 | 12.4 | 44.9 |
| 3 | 10.4 | 536 | 216 | 14.0 | 42.5 |
| 4 | 10.9 | 360 | 236 | 21.6 | 26.2 |
| 5 | 34.7 | 210 | 170 | 37.8 | 9.0 |
| 6 | 34.7 | 150 | 418 | 42.4 | 7.3 |
| 7 | 44.8 | 177 | 413 | 50.5 | 4.6 |

TABLE II

| | Impurities in Final Aqueous Streams | |
|---|---|---|
| Ex. No. | Wt % NaOH in NaOH Concentrate | ppm NaOH in $H_2O$ from t-butyl benzene-$H_2O$ Extract | ppm TOC in NaOH Concentrate |
| 3 | 14.0 | 83 | 370 |
| 6 | 42.4 | 262 | 10 |

EXAMPLES 8-11

Examples 8-11 were carried out using an apparatus as described in FIG. 1 and the same procedure of Example 1 except that ethylbenzene was used to extract $H_2O$ from an aqueous sodium hydroxide solution. A sodium hydroxide solution and ethylbenzene mixture was pressurized to 2000 psig and heated to 608° F. Feed rates of the sodium hydroxide solution and the ethylbenzene were changed between runs. The identical composition of sodium hydroxide feed solution was used in Examples 9 and 10. The results described in Table III were obtained during each run after steady state conditions of mass flow rate and temperature were reached.

TABLE III

| Ex. No. | Feed NaOH Solution Wt % NaOH | Feed NaOH Solution Grams/hour | Feed Ethyl-benzene grams/hour | Wt. % NaOH in NaOH Concentrate | Wt % $H_2O$ in Ethyl-benzene-$H_2O$ Extract |
|---|---|---|---|---|---|
| 8 | 10.8 | 411 | 94 | 12.2 | 43.2 |
| 9 | 12.7 | 432 | 192 | 16.3 | 34.2 |
| 10 | 12.7 | 133 | 419 | 28.6 | 16.5 |
| 11 | 47.6 | 338 | 383 | 50.3 | 5.2 |

What is claimed is:

1. A method to remove water from an aqueous alkali metal hydroxide solution comprising:
    (a) contacting the aqueous alkali metal hydroxide solution with a sufficient amount of an organic liquid to form at least an organic liquid-water phase and an aqueous alkali metal hydroxide solution phase at an elevated temperature and pressure, and
    (b) separating at least a portion of the organic liquid-water phase from the aqueous alkali metal hydroxide solution phase.

2. The method of claim 1 wherein step (b) is carried out at same temperature and pressure of step (a).

3. The method of claim 1 wherein at least a portion of the water in the organic liquid water phase is separated from the organic liquid.

4. The method of claim 1 including further the steps of:
    (c) cooling the organic liquid-water phase sufficient to form a water phase and an organic liquid phase; and
    (d) recovering at least a portion of the organic liquid.

5. The method of claim 1 including further the steps of:
    (c) pressurizing the organic liquid-water phase sufficient to form a water phase and an organic liquid phase; and
    (d) recovering at least a portion of the organic liquid.

6. The method of claim 4 wherein the temperature of step (c) is at least about 20° F. less than the temperature of said contacting step.

7. The method of claim 6 wherein the organic liquid is recirculated to step (a) of claim 1.

8. The method of claim 1 wherein the alkali metal hydroxide is sodium hydroxide.

9. The method of claim 8 wherein the organic liquid is a hydrocarbon.

10. The method of claim 9 wherein the hydrocarbon contains about 6 to about 20 carbon atoms per molecule.

11. The method of claim 10 wherein the hydrocarbon is isopropylbenzene.

12. The method of claim 10 wherein the hydrocarbon is tertiary butylbenzene.

13. The method of claim 10 wherein the hydrocarbon is ethylbenzene.

14. The method of claim 11 wherein the aqueous sodium hydroxide is at an initial concentration of less than about 50 percent by weight sodium hydroxide.

15. The method of claim 12 wherein the aqueous sodium hydroxide solution is at an initial concentration of less than about 50 percent by weight sodium hydroxide.

16. The method of claim 13 wherein the aqueous sodium hydroxide solution is at an initial concentration of less than about 50 percent by weight sodium hydroxide.

17. The method of claim 14 wherein sufficient water is removed from the aqueous sodium hydroxide solution to concentrate the solution up to about 50 percent by weight sodium hydroxide.

18. The method of claim 15 wherein sufficient water is removed from the aqueous sodium hydroxide solution to concentrate the solution up to about 50 percent by weight sodium hydroxide.

19. The method of claim 16 wherein sufficient water is removed from the aqueous sodium hydroxide solution to concentrate the solution up to about 50 percent by weight sodium hydroxide.

20. The method of claim 1 wherein the temperature of said contacting step is up to about the critical temperature of said organic liquid.

21. The method of claim 1 wherein the temperature of said contacting step is at least the critical temperature of said organic liquid.

22. The method of claim 1 wherein the temperature of said contacting step is above about 500° F.

23. The method of claim 1 wherein the pressure is above about 1000 psig.

24. A method comprising contacting an aqueous alkali metal hydroxide solution with a sufficient amount of an organic liquid to extract at least a portion of the water from the hydroxide solution at an extraction temperature and an extraction pressure and separating at least a portion of the organic liquid containing the extracted portion of water from the hydroxide solution.

25. The method of claim 24 wherein the extraction temperature is above about 500° F.

26. The method of claim 25 wherein the extraction pressure is above about 1000 psig.

* * * * *

UNITED STATES PATENT AND TRADEMARK OFFICE
CERTIFICATE OF CORRECTION

PATENT NO. : 4,505,885
DATED : Mar. 19, 1985
INVENTOR(S) : William C. Sumner, Jr; Gale G. Hoyer; William G. Kozak It is certified that error appears in the above-identified patent and that said Letters Patent is hereby corrected as shown below:

Col. 5, line 16, before the word "sodium" insert --a--.

Col. 6, line 28, Claim 3, after "liquid" insert -- -water phase--.

Signed and Sealed this

Seventeenth Day of September 1985

[SEAL]

Attest:

DONALD J. QUIGG

Attesting Officer

Commissioner of Patents and Trademarks—Designate